United States Patent [19]

Voller

[11] 4,187,961
[45] Feb. 12, 1980

[54] DYE METERING SYSTEM

[76] Inventor: Ronald L. Voller, 1265 Franklin La., Buffalo Gove, Ill. 60090

[21] Appl. No.: 888,332

[22] Filed: Mar. 20, 1978

[51] Int. Cl.² .............................................. B65G 33/14
[52] U.S. Cl. .................................. 222/133; 222/333; 222/413
[58] Field of Search ............... 222/129, 133, 145, 333, 222/413, 132

[56] References Cited

U.S. PATENT DOCUMENTS

| 2,140,471 | 12/1938 | Frolich et al. | 222/145 X |
| 2,800,252 | 7/1957 | Wahl | 222/413 X |
| 2,932,712 | 4/1960 | Levin | 222/413 X |
| 3,897,889 | 8/1975 | Hindermann | 222/413 X |
| 4,108,334 | 8/1978 | Moller | 222/145 X |

*Primary Examiner*—Joseph J. Rolla

*Attorney, Agent, or Firm*—Vogel, Dithmar, Stotland, Stratman & Levy

[57] ABSTRACT

A system for introducing a predetermined amount of particulate matter to a continuous flowing stream of material. The system consists of a hopper connected via a tube having a screw drive positioned therein to a flowing stream of plastic material to be injection molded or extruded. The hopper and tube are constructed and arranged so that dye material in the hopper contacts only the hopper and the inside of the tube, thereby facilitating easy changing of the hopper and tube to permit the introduction of a different colored dye to the plastic material to be injection molded or extruded. The motor mechanism used to drive the screw can be swung out of the way to permit motors to be changed and also to permit the easy changing of both the hopper and the tube containing the screw drive.

13 Claims, 7 Drawing Figures

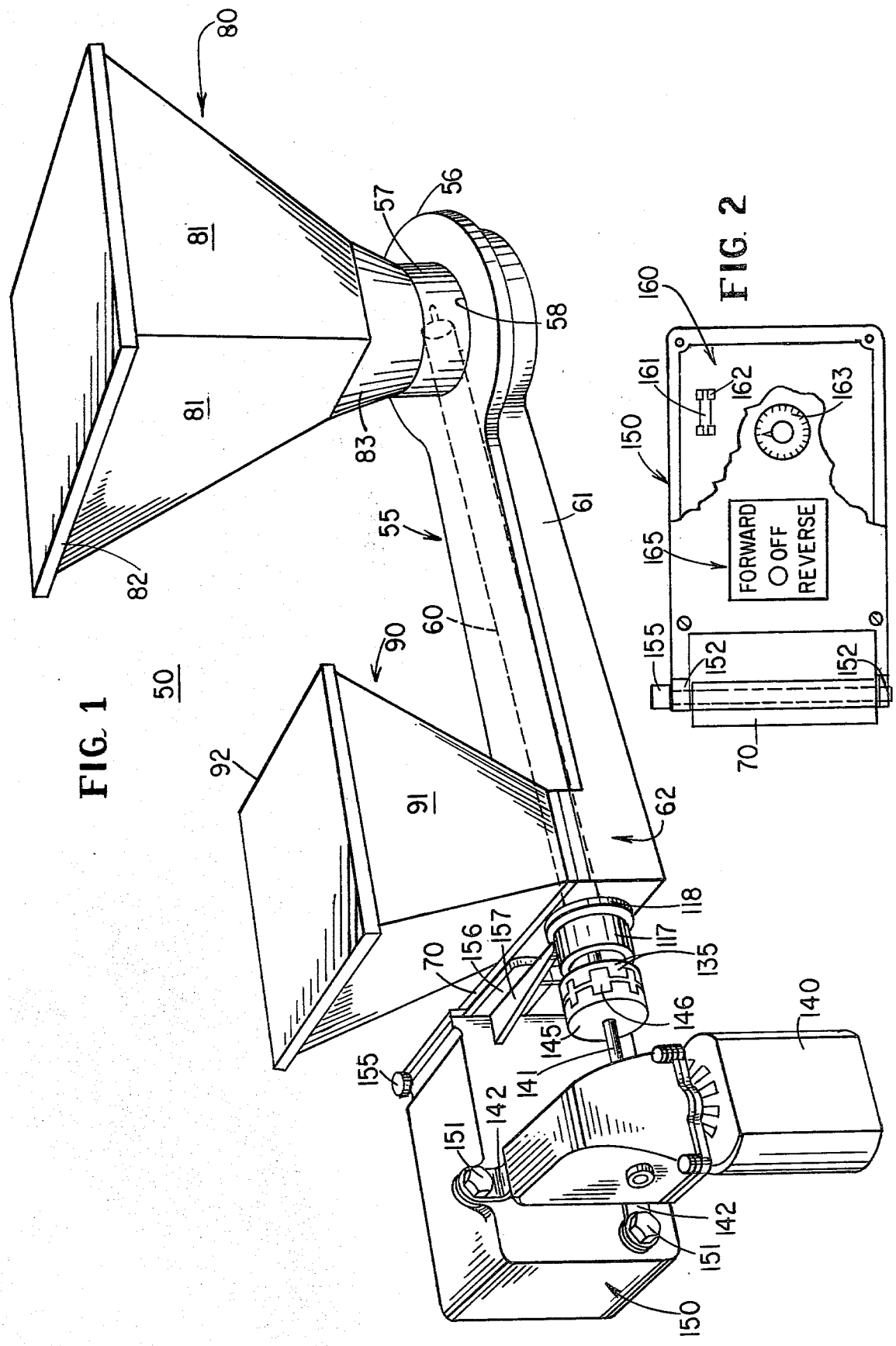

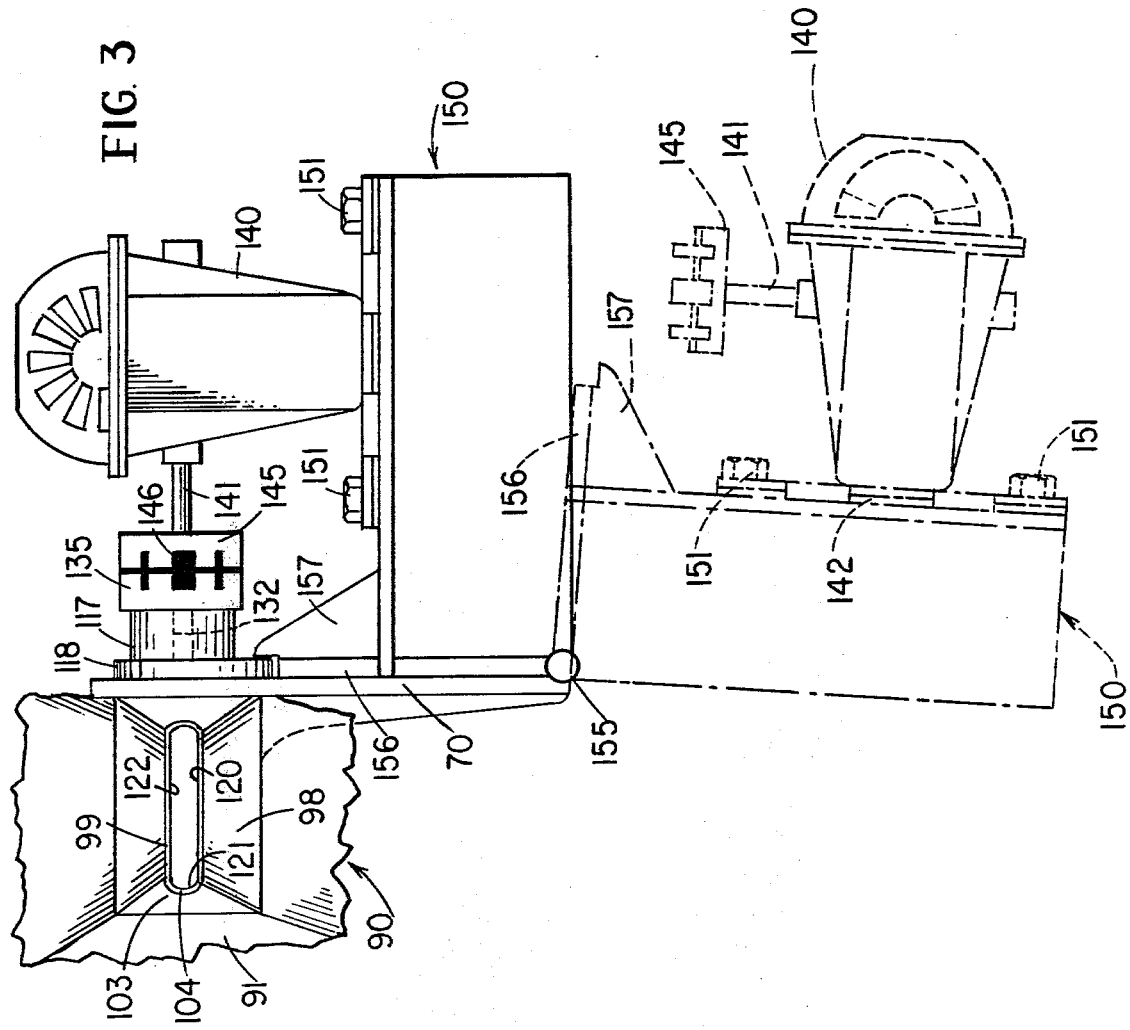

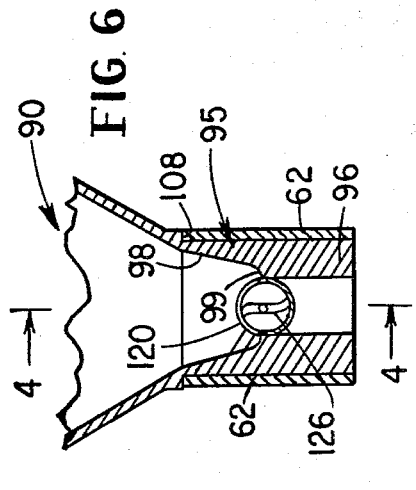
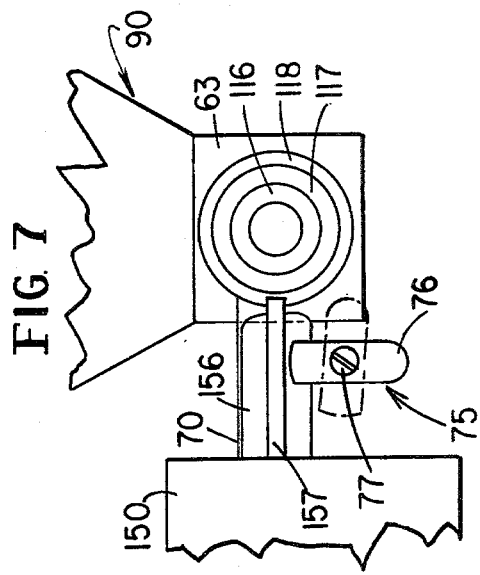
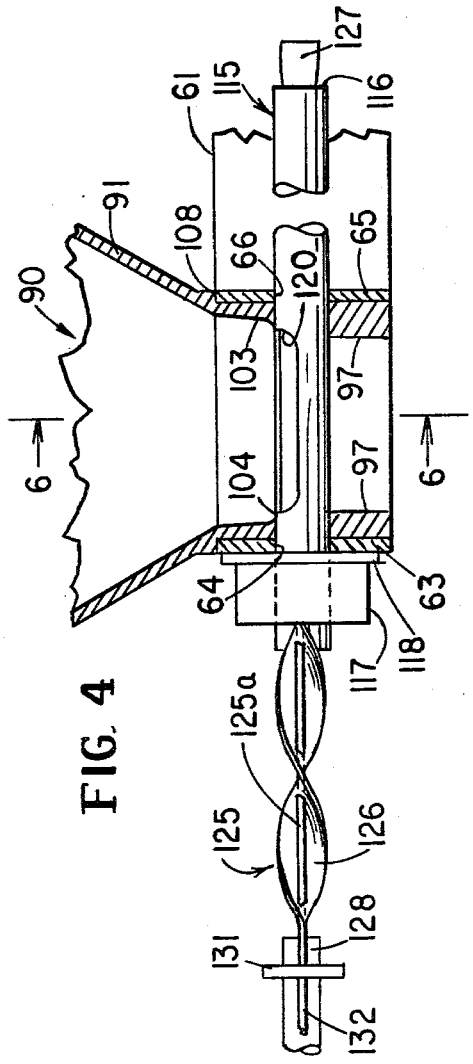
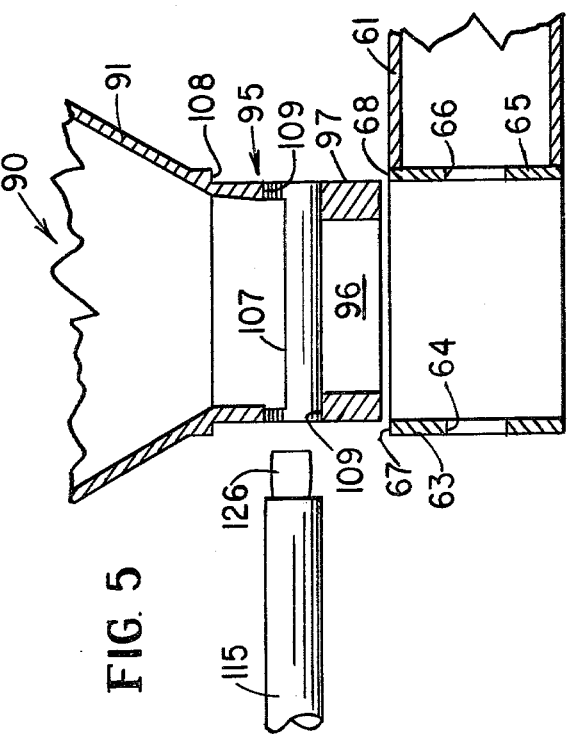

DYE METERING SYSTEM

BACKGROUND OF THE INVENTION AND PRIOR ART STATEMENT

Often in the plastics industry, the final color of the plastic part is introduced into the plastic forming the part just prior to the extrusion or injection molding thereof. Because the dyes most often are introduced as concentrated granulars, pellets, flakes or powder, the dyes are messy and difficult to handle. This causes problems where it is necessary to change colors during the extruding or injection molding of the plastic parts. The dyes used in the plastics industry are usually messy and difficult to clean, thereby requiring an excessive amount of down time to change dyes or to alter the apparatus where that action is desirable. For this reason, there has been a need in the art to provide a system which permits easy changing of the dye stock and also permits changing of the colors without mixing colors and having residual amounts of the old dye present in the system to mix with the new color. Until the present time, there has not been available a system which permits easy interchanging of the various colored dyes without the attendant difficulty of clean-up and the like. An additional problem is that often it is desirable to introduce the dyes into the main plastic material in varying amounts. This means that the dye stock must be driven at different rates of speed and may require that the apparatus forming the dye metering system be altered. No equipment presently known or available permits easy interchanging of drive systems to facilitate the wide variety of volumetric flow rates necessary for the various colored dyes.

BRIEF SUMMARY OF THE INVENTION

This invention relates to a system for introducing a predetermined amount of particulate matter to a continuous flowing stream of material in which a closed flow path is created between the storage hopper for the particulate matter and the continuous stream of material, which continuous path is closed and enables substitution of entire mechanisms with different dye stocks thereby maintaining separate the different colored dye stocks.

An important object of the present invention is to provide a system defining a closed path between a dye storage hopper and a flowing material into which the dye is to be injected.

Another object of the present invention is to provide a system of the type set forth wherein the drive motor for the dye injection is pivotally mounted to the frame holding the dye hopper and may be swung out of engagement with the dye drive mechanism to facilitate changing of the motor or facilitate changing of the dye hopper and dye drive mechanism.

Still another object of the present invention is to provide a system for introducing a predetermined amount of particulate matter to a continuous flowing stream of material flowing in a first path from a source thereof, the system comprising a hopper for storing the particulate matter having a downwardly extending neck defining an opening in communication with the hopper storage area, a hollow frame member extending between the hopper and the first path, a sleeve extending longitudinally thru the frame member to the first path and having an opening therein complimentary in size to the opening defined by the neck and in registry therewith, the opening defined by the hopper neck and the opening in the sleeve cooperating with the hopper and the sleeve to define a closed second path from the hopper, through the sleeve to the first path, and motor means for transporting particulate matter from the hopper along the second path to the first path at a predetermined rate.

A further object of the present invention is to provide a system for introducing a predetermined amount of particulate matter to a stream of material flowing in a first path from a source thereof, the device comprising a hopper for storing the particulate matter having a downwardly extending neck defining an opening, a hollow frame member extending between the hopper and the first path, a sleeve extending through the frame members having an opening therein complimentary in size and in registry with the opening defined by the neck defining a second path between the hopper and the first path, a screw drive slidably and rotatably mounted in the sleeve for transporting particulate matter from the hopper along the second path to the first path to comingle the particulate matter and the flowing material, a motor having the output shaft thereof engageable with the screw drive to transport particulate matter from the hopper along the second path to the first path, and means for moving the motor between a position wherein the motor output shaft is in engagement with the screw drive and a position wherein the motor and the output shaft are spaced away from the screw drive, the hopper, sleeve and screw drive being removable and replaceable when the motor and output shaft thereof are spaced away from the screw drive.

These and other objects of the present invention may be more readily understood by reference to the following specification and drawings, in which:

BRIEF DESCRIPTION OF THE DRAWINGS

FIG. 1 is a perspective view of the dye metering system specifically illustrating the spacial relationship between the motor drive, the dye storage hopper and the plastic material storage hopper;

FIG. 2 is a front elevational view of the control panel for the dye metering drive motor;

FIG. 3 is a top plan view of a portion of the system illustrated in FIG. 1;

FIG. 4 is an exploded side view taken in section of the dye storage hopper as seen along lines 4—4 of FIG. 6;

FIG. 5 is an exploded view of the dye storage hopper and frame illustrated in FIG. 4 with the dye storage hopper removed from the frame;

FIG. 6 is a sectional view of the dye storage hopper and frame illustrated in FIG. 4 as seen along lines 6—6 thereof; and FIG. 7 is an elevational view of the dye storage hopper and frame therefor showing the locked position of the motor mounting plate and dye storage hopper.

DESCRIPTION OF THE PREFERRED EMBODIMENT

Referring now to the drawings, there is disclosed a system 50 including a frame member 55 interconnecting a plastic storage hopper 80 and a dye storage hopper 90. A motor 140 is connected to a screw drive 125 for transporting dye particulate material from the dye storage hopper 90 to the flow path defined by the plastic material escaping from the storage hopper 80.

The frame member 55 has a longitudinally extending arm 61 with an annular end 56 with an upstanding annular neck 57 having a circular cross section constructed to fit within a circular aperture 58 in the annular end 56. The frame member 55 has a longitudinally extending opening 60 circular in transverse cross section, which extends through the elongated arm 61 interconnecting the annular end 56 with a support or mounting end 62 which is closed by an end panel 63 having an aperture 64 providing communication between the elongated opening 60 and the outside of frame member 55. Spaced inwardly from the end panel 63 is a brace 65 having an aperture 66 therein in registry with the aperture 64. The top of the end panel 63 and the brace panel 65 provide abutment surfaces 67 and 68 respectively.

The end panel 63 extends perpendicularly away from the elongated arm 61 and forms a mounting panel 70 on which is mounted a lock 75 (see FIG. 7) consisting of a tab 76 mounted by means of a fastener 77 to the mounting panel 70.

A storage hopper 80 is an inverted, truncated pyramid square in transverse cross section and has a capacity sufficient to store the required amount of plastic material, usually in the form of pellets or the like, to be used in the injection molding or extruding operation. The storage hopper 80 is provided with four tapered walls 81 meeting at a circular transverse cross section 83 in communication with the upstanding circular neck 57 of the frame member 55. A removable top 82 is provided. Sufficient plastic material in the form of pellets or the like can be stored in the hopper 80 and fed by gravity to the injection molding or extruding machine positioned generally beneath the frame member 55. The flow path of the plastic material in the storage hopper 80 from the hopper to the injection or extruding machine is defined as a first flow path in the system 50.

A storage hopper 90 is inverted truncated pyramid square in transverse cross section with four downwardly slanting walls 91 closed by a removable top 92. The walls 91 terminate at a neck 95 which is formed of two straight side walls 96 and two straight end walls 97. The inner surface 98 of each side wall 96 has an inward taper forming an inwardly extending flange 99, and the end walls 97 are undercut at the bottom of the cylindrical aperture therethrough. The side walls 96 are mirror images of one to the other so that the side walls 96 cooperate with the inwardly extending flanges 99 thereof to provide a restricted area for contact with the material stored in the hopper 90. The upper inner surfaces 103 of the neck end walls 97 are inwardly tapered terminating at distal arcuate edges 104. The arcuate edges 104 are in registry with the bottom portions of the end wall 97 and define the openings 109 circular in transverse cross section sized to accommodate a sheath 115 holding the screw drive 125, as hereinafter will be explained. The combination of the inwardly sloping surfaces 98 and 99 of the side walls 96 and the inwardly sloping surfaces 103 of the end walls 97 combine to define a restricted chamber 107 (see FIG. 5), which is in communication with the materials stored in the hopper 90. Finally, the juncture between the inwardly and downwardly slanting walls 91 and the neck 95 are provided with two external shoulders 108 extending across the end walls 97 of the neck 95, for a purpose hereinafter set forth.

A hollow sheath 115 extends through the longitudinally extending circular opening 60 in the frame member 55 and has a length sufficient to extend from beyond the front or end panel 63 to the middle of the annulus 56, that is, the end 116 of the sheath 115 extends into approximately the center of the annulus and hence toward the center of the first flow path. The other end of the hollow metal sheath 115 is provided with a cylindrical collar 117 extending away from a circular flange 118. The sheath 115 is provided with a slot 120 defined by the end surfaces 121 (see FIG. 3) and the sides 122. The end surfaces 121 of the slot 120 coincide precisely as possible with the distal edges 104 of the inwardly slanting surfaces 103 of the end walls 97 and the side surfaces 122 of the slot 120 are as substantially as possible in alignment with the edges of the inwardly extending flanges 99 of the side walls 96. A screw drive 125 includes a shaft 125A with a continuous blade 126 having an end 127 extending beyond the associated sheath 115. The end 127 of the screw drive 125 extends into the first flow path defined by the falling particulate material stored in the storage hopper 80. A blade holder 128 is at the other end of the screw drive 125 and includes a positioning flange 131 sized to fit within the collar 117 and a shaft 132 extending outwardly from the collar 131 in a direction opposite to the blade 126. Connected to the end of the shaft 132 is a clutch assembly 135.

The motor 140 with the three mounting tabs 142 is provided with an output shaft 141 having a clutch 145 on the end thereof, which shaft and clutch extend toward the shaft and clutch 132, 135 respectively. The clutches 135 and 145 are identical and are frictionally engaged by a rubber spider 146. The motor 140 is mounted onto a motor mounting box 150 by means of three mounting bolts and nuts 151 which cooperate with the tabs 142. The mounting box 150 is provided with spaced arms 152 each provided with an aperture at the end thereof for receiving a pivot pin 155 which extends through the arms 152 and a sleeve in the mounting panel 70, thereby hingedly mounting the motor mounting box 150 to the mounting panel 70 and frame 55. A plate 156 extends forwardly of the motor mounting box 150 and is connected to a strength providing rib 157 which connects the plate 156 and the box 150. The portion of the plate 156 extending below the rib 157 coacts with the before described lock mechanism 75 to retain the motor mounting box 150 in the engagement position shown in full line in FIG. 1. Movement of the lock or latch 75 to the dotted line position shown in FIG. 7, permits the motor mounting box 150 to be pivoted to the dotted line position shown in FIG. 3, for a purpose hereinafter set forth.

On the side of the motor mounting box 150, is a control panel 160 having a fuse 161 and holder 162 therefor and a rheostat or voltage clipper 163. A three position switch 165 is provided having forward, reverse and off positions as illustrated. The controls for the system 50 are positioned within the motor mounting box 150 and are closed by means of the control panel 160.

Operation of the system 50 will now be set forth. The plastic material to be either extruded or injection molded, is loaded into the hopper 80. This material usually is in the form of pellets or granulars and may be any synthetic organic resin which is desired to be used. The dye stuff which may be in the form of granulars, pellets, flakes or powder, is loaded into the hopper 90. Both the hoppers 80 and 90 have covers, 82 and 92 respectively, which are used to retain the materials in the hoppers. The dye stuff is usually a synthetic organic resin, but because of its great surface area, it is very messy to work with and causes extreme clean-up problems and a substantial amount of down time.

In the position shown in FIG. 4, the hopper 90 with the external shoulders 108 rests on the panels 63 and 65 and the respective abutment surfaces 67 and 68. In this configuration, the sides 96 and ends 97 of the hopper neck 95 fit snugly within the associated frame 55 and particularly within the opening between the sides 61 and the panels 63 and 65. The metal sheath 115 is in position within the longitudinally extending opening 60 in the frame 55 and the slot 120 is facing upwardly into the hopper 90 and presents a defined and restricted chamber 107. The chamber 107 is defined by the slot 120 and the inwardly sloping surfaces 103 of the end walls 97 which at the distal edges 104 thereof coincides with the endmost surfaces 121 of the slot 120. The inner surfaces 98 of the side walls 96 slope inwardly with the flanges 99 abutting the sheath 115 along the side edges 122 of the slot 120. Accordingly, the dye stuff within the hopper 90 has limited areas to contact, and in fact, contacts only the inside of the sheath 115 with the outer surfaces of the sheath being protected from contact with the dye stuff.

The screw drive 125 is positioned with the blade 126 inside the sheath 115 and extends completely therethrough with the distal end 127 of the blade being positioned within the first flow path defined by the motion of the plastic material in the hopper 80 under the influence of gravity. The first flow path is the path taken by the material in the hopper 180 when it is allowed to be fed by gravity to the associated extruding or injection molding machine (not shown). Activation of the screw drive 125 causes rotation of the blade 126 within the sheath 115 and transports dye stuff from the hopper 90 to the central area of the first flow path, as defined by the material flowing from the hopper 80. Simultaneous feeding of the dye stuff 90 through the closed path defined by the hopper 90 and the sheath 115 and gravity feed of the material from the hopper 80, causes intermingling of the dye stuff being fed with the material in the hopper 80 prior to introduction of the material into the associated injection molding or extruding machine. This intimate intermingling is necessary to mix the dye stuff uniformly prior to forming the part to obtain even color distribution.

Rotation of the screw drive 125 is accomplished by activation of the motor 140. The operator activates the motor 140 at the three position switch 165 which causes the output shaft 141 to rotate. Since the clutches 145 and 135 with the spider 146 respectively interconnect the shaft 141 with the shaft 132, activation of the motor causes the blade 126 to rotate within the sheath 115. Therefore, activation of the motor 140 causes dye stuff within the hopper 90 to be transported to the first flow path and to intermingle intimately with the plastic material flowing from the hopper 80 to the associated injection molding or extruding machine, thereby to obtain even color distribution in the produced part. The voltage clipper or rheostat 163 permits infinite control of the speed at which the blade 126 rotates, thereby permitting the quantity of dye stuff introduced into the plastic part to be precisely controlled.

Often it is necessary to change drastically the amount of dye stuff to be fed from the hopper 90 to the injection molding or extruding machine. The system 50 enables the motor 140 to be interchanged without undue difficulty. Two methods are available. In the first method, the fasteners 151 are loosened and the entire motor 140 is removed from the motor mounting box 150 and replaced with the new motor. Although this takes some time, because there are only three fasteners 151 and usually a single electrical connection to be made, replacement of the motor 140 is not too difficult, nor does it require an excessive amount of down time. The second method is even quicker and involves merely disengaging the clutches 145 and 135 by removal of the spider 146 and moving the lock 75 to the dotted line position in FIG. 7, and thereafter, swinging the motor mounting box 150 on the pivot pin or hinge 155 to the dotted line position shown in FIG. 3. At this time, the pivot pin is removed and the entire motor 140, motor mounting box 150 and control panel 160 are removed and replaced with a similar unit having the desired motor characteristics. As can be seen, the second method requires less than a minute to accomplish. Thereafter, the new motor and control box is pivoted to the full line position shown in FIG. 1, wherein the new clutch is engaged with the clutch 135 and spider 146 and the entire system 50 is ready to operate.

Often it is necessary to change the color of the dye stuff introduced into the associated extruder or injection molder. This is the more often encountered case and one which the system 50 is expressly designed to accommodate. When it is desired to change dye stuff, the motor mounting box 150 is moved from the full line position in FIG. 1 to the dotted line position in FIG. 3. Thereafter, the entire sheath or sleeve 115 and the associated screw drive 125 is pulled longitudinally out of the frame 55. Because the dye stuff does not engage the outer periphery of the sheath or sleeve 115, little or none of the dye stuffs are outside of the closed path as hereinbefore defined and hence, the operation is not messy and requires little clean-up. Thereafter, the entire hopper 90 may be slid out of the associated frame member 55 as shown in FIG. 5, thereby allowing an entire new hopper 90 with the associated dye stuffs to be introduced into the frame 55 and a new sheath or sleeve 115 and screw drive 125 inserted into the frame 55 to once again complete the system 50, all without the usual mess and expensive clean-up time required.

The foregoing illustrates the important concepts of the present system 50. The nesting of the hopper 90 in the frame 55 along with the well defined and restricted chamber 107 ensures that the dye stuff within the hopper does not contact outside surfaces of the system, and hence, is retained within a well defined area. The system 50 is designed to permit the hopper 90, the sheath or sleeve 115 and the screw drive 125 to be removed, thereby limiting the amount of clean-up necessary when dye stuffs are changed. The pivotal mounting of the motor mounting box 150 to the frame 55 allows both the motor 140 or the entire control assembly to be interchanged and also is a critical feature to the easy removal of the hopper 90, the sheath or sleeve 115 and the screw drive assembly 125.

While there has been described what at present is considered to be the preferred embodiment of the present invention, it will be understood that various modifications and alterations may be made therein without departing from the true spirit and scope of the present invention, and it is intended to cover in the appended claims all such modifications and alterations.

What is claimed is:

1. A system for introducing a predetermined amount of particulate matter to a continuous flowing stream of material flowing in a first path from a source thereof, said system comprising a hopper having a storage area for storing the particulate matter and having a downwardly extending neck defining an opening in communication with said hopper storage area, a frame member, a sleeve supported by said frame member extending to the first path and having an opening therein complementary in size to the opening defined by said neck and in registry therewith, said opening defined by said hopper neck and said opening in said sleeve cooperating with said hopper and said sleeve to define a closed second path from said hopper through said sleeve to the first path, said hopper and said sleeve being frictionally mounted with respect to each other and to said frame for easy removal and replacement, and means for transporting particulate matter from said hopper along the second path to the first path at a predetermined rate.

2. The system set forth in claim 1, wherein said neck frictionally engages and fits within said frame member, said neck and said frame member each having opposed apertures therein to accommodate said sleeve passing therethrough.

3. The system set forth in claim 1, wherein said neck is formed by a wall cooperating with said sleeve and the opening therein, thereby preventing the particulate matter in said hopper from contacting the exterior of said sleeve when the openings are in alignment.

4. The system set forth in claim 1, wherein said registered openings are slots.

5. The system set forth in claim 1, wherein said means includes a motor operatively connected to an elongated screw drive within said sleeve providing transport between said hopper and the first flow path.

6. The system set forth in claim 1, wherein the inner surfaces of said hopper neck slope inwardly to define an outlet smaller in transverse cross section than said neck and at least as large as the opening in said sleeve.

7. A system for introducing a predetermined amount of particulate matter to a stream of material flowing in a first path from a source thereof, said system comprising a hopper for storing the particulate matter having a downwardly extending neck defining an opening, a hollow frame member extending between said hopper and the first path, a sleeve extending through said frame member having an opening therein complementary in size and in registry with said opening defined by said neck defining a second path between said hopper and the first path, a screw drive slidably and rotatably mounted in said sleeve for transporting particulate matter from said hopper along the second path to the first path to introduce the particulate matter into the flowing material, a motor having the output shaft thereof engageable with said screw drive to transport particulate matter from said hopper along the second path to the first path, and means for moving said motor between a position wherein said motor output shaft is in engagement with said screw drive and a position wherein said motor and said output shaft are spaced away from said screw drive, said hopper, sleeve and screw drive being removable and replaceable when said motor and output shaft thereof are spaced away from said screw drive.

8. The system set forth in claim 7, wherein said motor is pivotally mounted to said frame member.

9. The system set forth in claim 7, wherein said motor has an output shaft having a coupling at the distal end thereof, and said screw drive has a coupling mounted on one end thereof, said output shaft coupling and said screw drive coupling cooperating for mating engagement therebetween to couple said motor to said screw drive.

10. The system set forth in claim 7, wherein said frame member supports said hopper at one end of said frame member and said motor is hingedly mounted to said frame member to facilitate easy changing of said motor to accommodate different rates of particulate matter transfer by said screw drive and to permit easy removal of said hopper and said screw drive and said sleeve.

11. A system for introducing a predetermined amount of particulate matter to a stream of material flowing in a first path from a source thereof, said system comprising a hopper for storing the particulate matter having a downwardly extending neck defining an opening, a hollow frame member extending between said hopper and the first path, a sleeve extending through said frame member having an opening therein complementary in size and in registry with said opening defined by said neck defining a second path between said hopper and the first path, a screw drive slidably and rotatably mounted in said sleeve for transporting particulate matter from said hopper along the second path to the first path to introduce the particulate matter into the flowing material, a motor having the output shaft thereof engageable with said screw drive to transport particulate matter from said hopper along the second path to the first path, means for moving said motor between a position wherein said motor output shaft is in engagement with said screw drive and a position wherein said motor and said output shaft are spaced away from said screw drive, said hopper and sleeve and screw drive being removable and replaceable when said motor and output shaft thereof are spaced away from said screw drive, and control means mounted to said frame having a three position switch and voltage clipper connected to said motor, said motor being removably mounted to said control means to permit said motor to be changed without removing said control means from said frame.

12. The system set forth in claim 11, wherein said control means is hingedly mounted to said frame so as to permit swinging movement of said motor and said control means with respect to said frame and to permit removal of the control means and said motor to accomodate substitution of another control means and motor combination.

13. A system for introducing a predetermined amount of particulate matter to a continuous flowing stream of material flowing in a first path from a source thereof, said system comprising a hopper having a storage area for storing the particulate matter and having a downwardly extending neck defining an opening in communication with said hopper storage area, said neck having opposed apertures therein of a predetermined size, a frame member extending between said hopper and the first path, a sleeve extending longitudinally through said opposed apertures in said neck and to the first path supported by said frame member and having an opening therein complementary in size to the opening defined by said neck and in registry therewith, said opening defined by said hopper neck and said opening in said sleeve cooperating with said hopper and said sleeve to define a closed second path from said hopper through said sleeve to the first path, and means for transporting particulate matter from said hopper along the second path to the first path at a predetermined rate.

* * * * *